United States Patent [19]

Ray

[11] Patent Number: 5,420,705

[45] Date of Patent: May 30, 1995

[54] SECONDARY QUANTIZATION OF DIGITAL IMAGE SIGNALS

[75] Inventor: Lawrence A. Ray, Rochester, N.Y.

[73] Assignee: Eastman Kodak Company, Rochester, N.Y.

[21] Appl. No.: 106,163

[22] Filed: Aug. 13, 1993

Related U.S. Application Data

[63] Continuation of Ser. No. 687,152, Apr. 18, 1991, abandoned.

[51] Int. Cl.⁶ .......................................... H04N 1/415
[52] U.S. Cl. .................................... 358/523; 348/419
[58] Field of Search ............... 358/133, 135, 445, 518, 358/523, 529; 382/50; H04N 1/415; 348/405, 399, 390, 387, 391, 419; 395/131

[56] References Cited

U.S. PATENT DOCUMENTS

| | | | |
|---|---|---|---|
| 4,386,366 | 5/1983 | Mori | 358/465 |
| 4,613,948 | 9/1986 | Gharavi | 358/426 |
| 4,677,479 | 6/1987 | Hatori et al. | 358/135 |
| 4,992,862 | 2/1991 | Gabor | 358/518 |
| 5,010,398 | 4/1991 | Nys et al. | 358/518 |
| 5,065,144 | 11/1991 | Edelson et al. | |
| 5,142,272 | 8/1992 | Kondo . | |
| 5,233,684 | 8/1993 | Ulichney . | |
| 5,283,664 | 2/1994 | Fujisawa et al. | 358/429 |

FOREIGN PATENT DOCUMENTS

551773A1 7/1993 European Pat. Off. .

OTHER PUBLICATIONS

J. B. Cohen, W. E. Kappauf, "Color mixture and fundamental metamers: Theory, algebra, geometry, application", *American Journal of Psychology*, Summer 1985, vol. 98, No. 2, pp. 171–259.

Billmeyer & Saltzman, *Principles of Color Technology*, 1981, pp. 60–64.

G. Wyszecki & W. S. Stiles, *Color Science: Concepts and Methods, Quantitative Data and Formulae*, 2nd Edition, 1982, pp. 456–461.

R. M. Gray, "Vector Quantization", *IEEE ASSP Magazine*, Apr. 1984, pp. 4–29.

*Primary Examiner*—Edward L. Coles, Sr.
*Assistant Examiner*—Kim Yen Vu
*Attorney, Agent, or Firm*—Thomas H. Close

[57] ABSTRACT

The secondary quantization of a plurality of signals such as scanner signals quantized in a colorimetric coordinate system for the modified spectral response of a display device. The secondary quantization reflects the nonlinear human response to color. Two embodiments of the secondary quantization method are presented. The first method is a global cost reduction approach and the second is a method that diffuses the visual costs equally into each secondary quantization level or bin.

18 Claims, 5 Drawing Sheets

SECONDARY QUANTIZATION OF DIGITAL IMAGE SIGNALS

This is a continuing application of U.S. Ser. No. 07/687,152, filed Apr. 18, 1991 in the names of Lawrence A. Ray, Christopher A. Heckman and James R. Sullivan, now abandoned.

TECHNICAL FIELD

The present invention relates to the field of digital imaging, and more particularly to a method for requantizing color digital image signals.

BACKGROUND ART

The electronic generation of an image is often done digitally. Often this is accomplished by a digital scanning device which takes the original analog image and converts it into a series of pixels, or picture elements, each of which is comprised of a number of bits. The image which is captured digitally is then reconstructed on a display device such as a CRT or thermal printer. For monochrome devices each pixel is encoded with a single n-bit number, while color systems commonly use a triple of binary numbers. Color systems typically use three (four in some instances) spectral components (see "Color Mixture and Fundamental Metamers: Theory, Algebra, Application," by Cohen and Kappauf, A. J. Psych., Vol. 98, No. 2, pp 171–259, Summer 1985) such as inks, toners, dyes, and phosphors to represent color space. Different colors are composed of combinations of these components. The relative amounts of the components form a coordinate system for the gamut of colors which can be represented. The color components are often referred to as the color primaries. In order to capture an image digitally, the analog image must be quantized into discrete digital values represented by n-bit code words.

When quantizing a signal the quantization regions are known as bins and the edges of the quantization regions are known as decision points.

It is possible that the input device can capture an image with more bits/pixel than can be displayed on the output device. Since the image has already been quantized into discrete levels, reducing the number of bits/pixel requires a secondary quantization of the original analog image signal also referred to herein as requantization.

One method of secondary quantization is simply to ignore the low order bits of the digital data. For example a 12-bit/pixel signal can be requantized to an 8-bit/pixel signal by eliminating the four least significant bits of each code word. Because this method does not account for non-linearities of the visual perception of color, it is not visually optimal. The result from such an approach can have visually objectionable contouring and a noticeable loss of continuous-tone quality. A two-dimensional slice for the three-dimensional secondary quantization using this method is shown in FIG. 2.

Quantization and secondary quantization via a functional form is another common approach, where the function $f(\_)$ (such as a cube root function) models the output of the system and the range of the output is uniformly quantized. If the decision points of the quantization of the output are denoted by $d_i$, $i=0,\ldots,2^n-1$, then the input quantization decision points are $f^{-1}(d_i)$. For color systems these simple secondary quantization schemes are not optimal from a visual perspective.

The use of channel-independent non-linear functions is also an approach to the secondary quantization. It suffers since it is visually sub-optimal and functional non-linearities do not fully utilize all possible secondary quantization levels. The visual sub-optimality is due to channel dependencies which the channel independent approach ignores.

Other approaches employ image metrics, such as variance or mean value of the pixels within an image to change the sampling rate adaptively (see "System for Requantization of Coded Picture Signals," by Yoshinori Hatori and Massahide Kaneko, U.S. Pat. No. 4,677,479) or to change the quantizer adaptively (see "Adaptive Type Quantizer," by Sumio Mori, U.S. Pat. No. 4,386,366). These schemes are signal dependent, and may not result in a minimal distortion to the output.

A final method is to partition the signal space into non-rectilinear cells is referred to as vector quantization (see R. M. Gray, "Vector quantization," IEEE ASSP Magazine, Vol. 1, April, 1984, pp. 4–29). This approach is illustrated in FIG. 3. Quantization occurs by matching a signal with the cell that results in minimal distortion. Since the quantization cells are not in general rectilinear with respect to the signal axes, an exhaustive table search algorithm must also be employed. Variations to this approach that decompose the space with m-ary trees are more efficient to implement, but are sub-optimal.

It is the object of the present invention to provide look-up tables which are channel separable and that are independent of the input signal. This approach is advantageous since the secondary quantization does not require adaptive processing hardware, and the implementation can be done by a set of look-up tables, which are separable, i.e., for n channels $c_1$ through $c_n$, $Q(c_1, c_2, \ldots, c_n) = (Q_1(c_1), Q_2(c_2), \ldots, Q_n(c_n))$, which simplifies the process. The secondary requantization pattern according to the present invention is represented in FIG. 4, which can be compared to FIGS. 2 and 3. It will be understood that the secondary quantization regions are 3-dimensional and are shown here as 2-dimensional for ease of description. Interchannel signal dependencies are considered in the determination of the set of look-up tables.

It is a further object of the present invention to provide a secondary quantization scheme for color imagery which minimizes the visual perception of information loss, is channel independent, and secondarily quantizes relative to the same color primaries as the original signal. The objects of the present invention are achieved by generating a set of color component requantization look-up tables by minimizing a visual cost function and employing the requantization look-up tables to requantize the color digital image. The look-up tables are generated by performing a first axial requantization of the color primaries of the color image signal, calculating a visual cost resulting from the first requantization, adjusting the first requantization based on visual cost criteria to obtain a second quantization, calculating a visual cost resulting from the second requantization, selecting either the first or second requantization having the least visual cost as a new first requantization, and repeating the steps of adjusting the requantization, calculating a visual cost and selecting the requantization having the least visual cost until a predetermined visual cost criteria is met. Two approaches are disclosed for minimizing the visual cost, one which minimized the maximum visual cost of any secondary quantization region, and the other which minimized the total visual cost of the system. The results depend upon the color primaries, however, the approach is sufficiently general to encompass a wide range of color primaries.

In the preferred modes of practicing the invention the tables are produced using either a minimum mean-square cost or a minimum-maximum cost criteria. The costs may be calculated in a uniform visual space (see Wyszecki and Stiles, Color Science: Concepts and Methods, Quantitative Data and Formulae, 2nd Ed., John Wiley & Sons, New York, 1982) after a transformation from the color space determined from the primaries of the display device.

MODES OF CARRYING OUT THE INVENTION

High quality digital color imaging systems imply a large bandwidth defined by a wide dynamic range, high precision, and fine spatial and temporal resolution. This equates to a large and often infeasible number of bits. System designs are generally forced to reduce this number to comply with constraints introduced by channel, storage, and component limitations.

As an example, the initial linear quantization of 12 bits/color/pixel performed by a typical high-resolution scanner and colorimetric processing partitions a color continuum linearly with each partition being assigned an interpretation or reconstruction value that is contained with the partition. The secondary quantization repartitions the color space more coarsely (from 12 bits/pixel/color to 8 bits/pixel/color, for example) with the constraint that the new partitions must be a subset of the initial partitions. The new partitions will be termed coarsely quantized levels. The initial partitioning can in some cases be solved analytically for minimum visual lost by differential calculus. In general, these methods cannot be used for the repartitioning, because the input values are discrete. Repartitioning is over a bounded region $(\alpha, \beta)$ with the partitions being connected segments of the region. The points where there is a transition between successive repartitions are known as decision points, and the values which are assigned to the repartitions are reconstruction values. The reconstruction values of the secondarily quantized colors can be selected independently from the reconstruction values of the original quantized colors. The successive repartitions are numbered from o to 2m−1 for an n to m bit requantization, with the reconstruction values being a value within each repartition.

Figure 1:
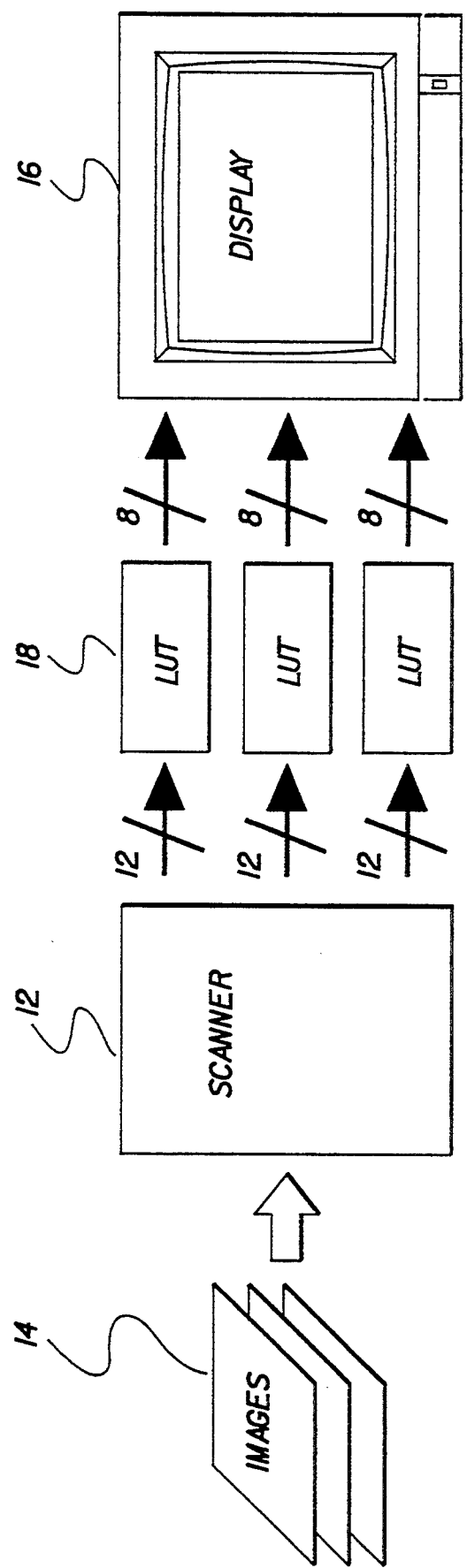
FIG. 1 illustrates a color imaging system according to the present invention.
Figure 2:
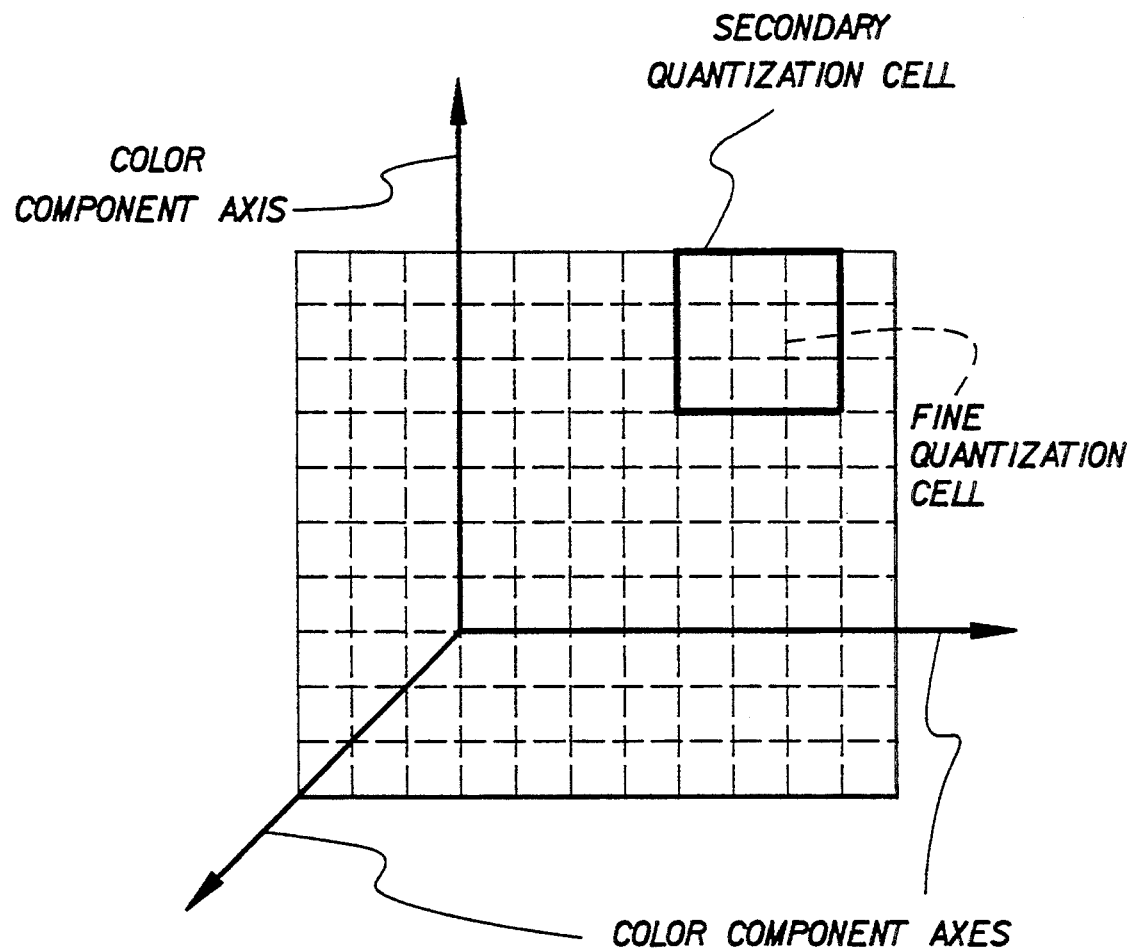
FIG. 2 illustrates a prior art method of secondary quantization by truncating the least significant Bit of the digital image signal.
Figure 3:
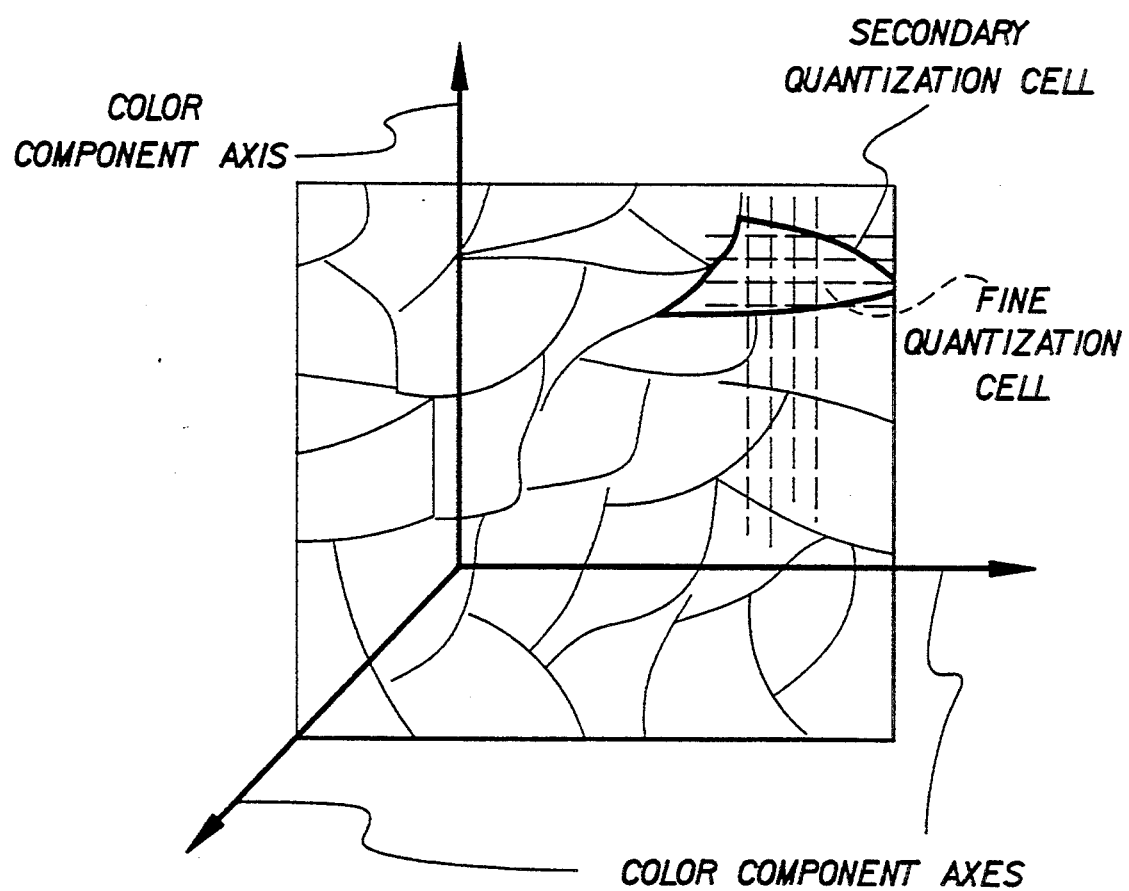
FIG. 3 illustrates a prior art method of secondary quantization by vector quantization.
Figure 4:
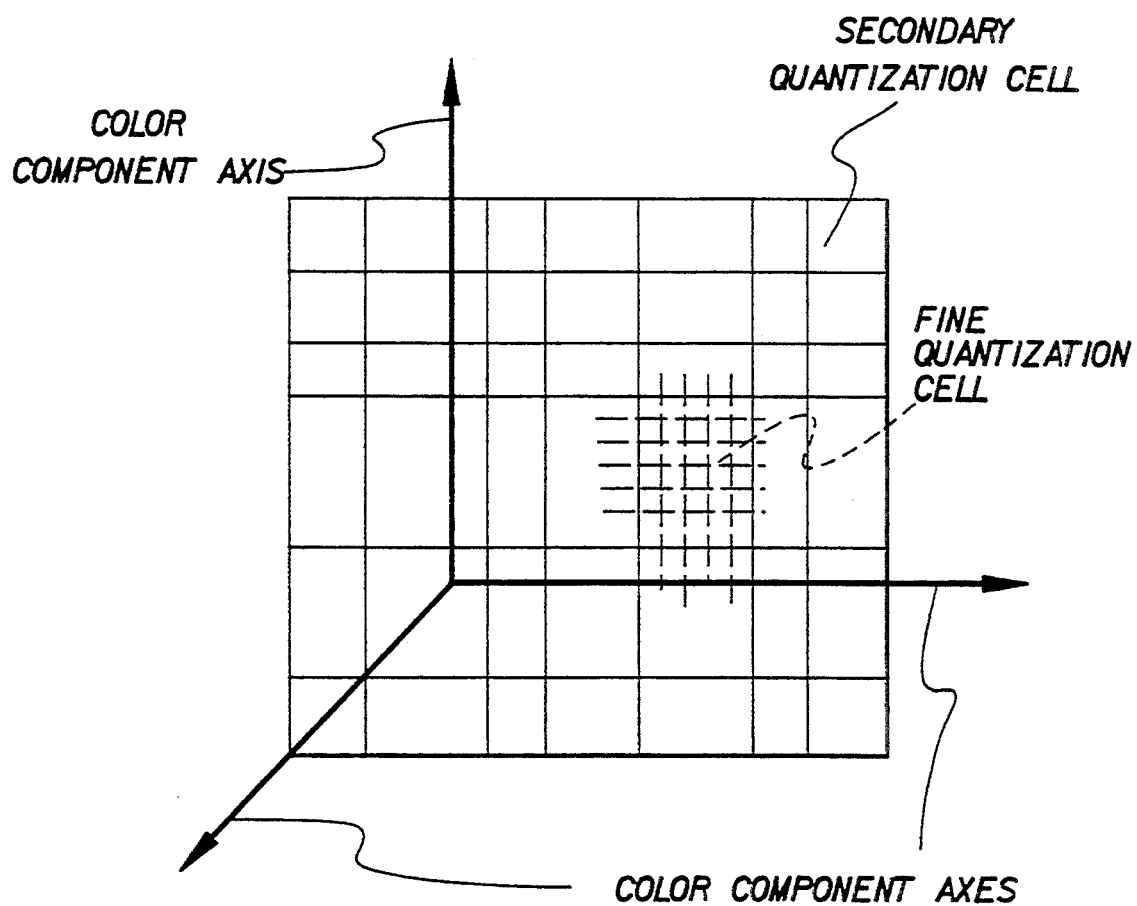
FIG. 4 illustrates the method of secondary quantization according to the present invention.

Referring to FIG. 1, a scanner 12 for scanning and digitizing color images 14 produces a 12-bit digital color image signal having 3 color primaries R, G, B. The 12-bit digital color signal is to be displayed on a 8-bit display device 16. Consequently, the 12 bit digital color image signal must be requantized to an 8-bit signal.

According to the present invention, three look-up tables (LUT) 18, 20, and 22 are employed for this purpose. The look-up tables may be embodied for example in read only memories (ROM) as is well known in the art. The ROM's may contain 4096 eight-bit words, one of which is produced as an output when the LUT is addressed with a 12-bit word.

The present invention is directed to producing values for the LUT-s that result in a minimum visual cost by the display after requantizing the original digital image signal. Although the examples described below deal with a 3 color component signal wherein each component is represented by 12-bit words requantized to 8-bits, the method is equally valid for requantizing a signal having components with different numbers of bits on each component in either the input and/or output signal.

The methods used to attain the minimum for each visual cost criterion are described in detail below. In the following, a specific set of primaries, used for High-Definition-Television (HDTV), are used as examples, as well as secondarily quantizing a 12-bit/color/pixel signal to an 8-bit/color/pixel signal. The methods are equally applicable to a other color primaries and in general n-to-m level secondary quantization where n is greater than m.

The linear colorimetric coordinate system does not have an invariant metric for visual perception. Numerous studies (see Billmeyer and Saltzman, *Principles of Color Technology* 2nd Ed, John Wiley & Sons, New York, 1981) have been conducted to find such a uniform color coordinate system with CIE L*a*b* and CIE LUV being examples. For points that are sufficiently close, all of these systems exhibit visual uniformity. For the purpose of this application we have chosen CIE L*a*b*. The transformation is rather simple, though nonlinear and is given by $$L^* = 116\left(f\left(\frac{Y}{Y_n}\right) - \frac{16}{116}\right) \quad (1)$$

$$a^* = 500\left(f\left(\frac{X}{X_n}\right) - f\left(\frac{Y}{Y_n}\right)\right)$$

$$b^* = 200\left(f\left(\frac{Y}{Y_n}\right) - f\left(\frac{Z}{Z_n}\right)\right)$$

where $$f(x) = \begin{cases} 7.787\ x + \frac{16}{116} & \text{if } x < 0.008856 \\ x^{\frac{1}{3}} & \text{otherwise} \end{cases}$$

XYZ are CIE tristimulus values, and $X_n$, $Y_n$, $Z_n$, are the tristimulus values of the "white" point of the color imaging system (e.g. the CCIR 601 primaries for HDTV at their maximum output levels). L*, a*, and b* are the color primaries of the CIE L*a*b* color coordinate system. This transformation will be denoted by L ( ).

In general, the color primaries to be requantized in the secondary quantization process can be converted into CIE XYZ tristimulus values by a multi-dimensional mapping. If the input signals represent linear drive signals for color primaries, then the transformation to CIE XYZ is linear. For purposes of notational simplicity the linear 10 assumption will be made and the color primaries used in the system will be referred to as R,G,B, and the linear transformation mapping the RGB color system to the XYZ color system will be denoted as A. For the case of the CCIR 601 primaries for HDTV the transformation, A, is represented by the matrix.

$$A = \begin{vmatrix} 0.3931 & 0.3654 & 0.1916 \\ 0.2122 & 0.7013 & 0.0865 \\ 0.0187 & 0.1120 & 0.9582 \end{vmatrix}$$

Including this transformation prior to secondary quantization, the statistical mean square norm visual cost to be minimized for an 8-bit secondary quantization application is:

Visual Cost = (3)

$$\sum_{i=0}^{256} \sum_{j=0}^{256} \sum_{k=0}^{256} \int_{b_k}^{b_{k+1}} \int_{g_j}^{g_{j+1}} \int_{r_i}^{r_{i+1}} (LA(r,g,b) - LA(\hat{r}_i, \hat{g}_j, \hat{b}_k))^2 drdgdb$$

where r, g, b are the coordinates of the input color space and $$\begin{cases} \hat{r}_i = & i^{th} \text{ coarsely equalized decision point of the} \\ & R \text{ component axis} \\ \hat{g}_j = & j^{th} \text{ coarsely equalized decision point of the} \\ & G \text{ component axis} \\ \hat{b}_k = & k^{th} \text{ coarsely equalized decision point of the} \\ & B \text{ component axis} \end{cases}$$

$\{r_i =$ the $i^{th}$ mid point on a continuous color component axis between the coarsely quantized decision points of the R component axis $\{g_j =$ the $j^{th}$ mid point on a continuous color component axis between the coarsely quantized decision points of the R component axis $\{b_k =$ the $k^{th}$ mid point on a continuous color component axis between the coarsely quantized decision points of the R component axis For example, if the last 50 input 12-bit values are mapped to the last coarse level for the R color channel or axis, $r_{255} = 4046$ and $r_{256} = 4096$.

The visual cost criteria accounts for interchannel effects which occur because of the nonlinearity of the CIE L*a*b* transformation.

For each visual cost criteria and minimization technique the coarsely requantized decision levels are represented as three vectors of length 257 denoted by $V_r$, $V_g$, and $V_b$, and the initial elements of all vectors are zero and the final element is 4096. The intermediate elements represent the indexes of the 12-bit decision points. Thus, if $V_r[i] = 237$ and $V_r[i+1] = 248$, the $i^{th}$ bin of the 8-bit secondary quantization spans the 12-bit decision points 237 through 248 exclusive. The three vectors have an additional constraint in that the values must be strictly monotonically increasing.

The visual cost minimization methods of the present invention operate on these vectors by changing the components of the vector, which has the effect of adjusting the coarsely requantized decision points. A change of a single component has the effect of changing the width of two bins.

The resulting vectors will determine a channel independent requantization of the fine input decision points to the coarse output decision points. The resulting vectors are easily implemented as one-dimensional look-up tables. Channel dependence is accounted for, however, in that the errors caused by the independent channel assignments are included in the determination of the overall secondary quantization visual cost defined by equation (3).

Figure 5:
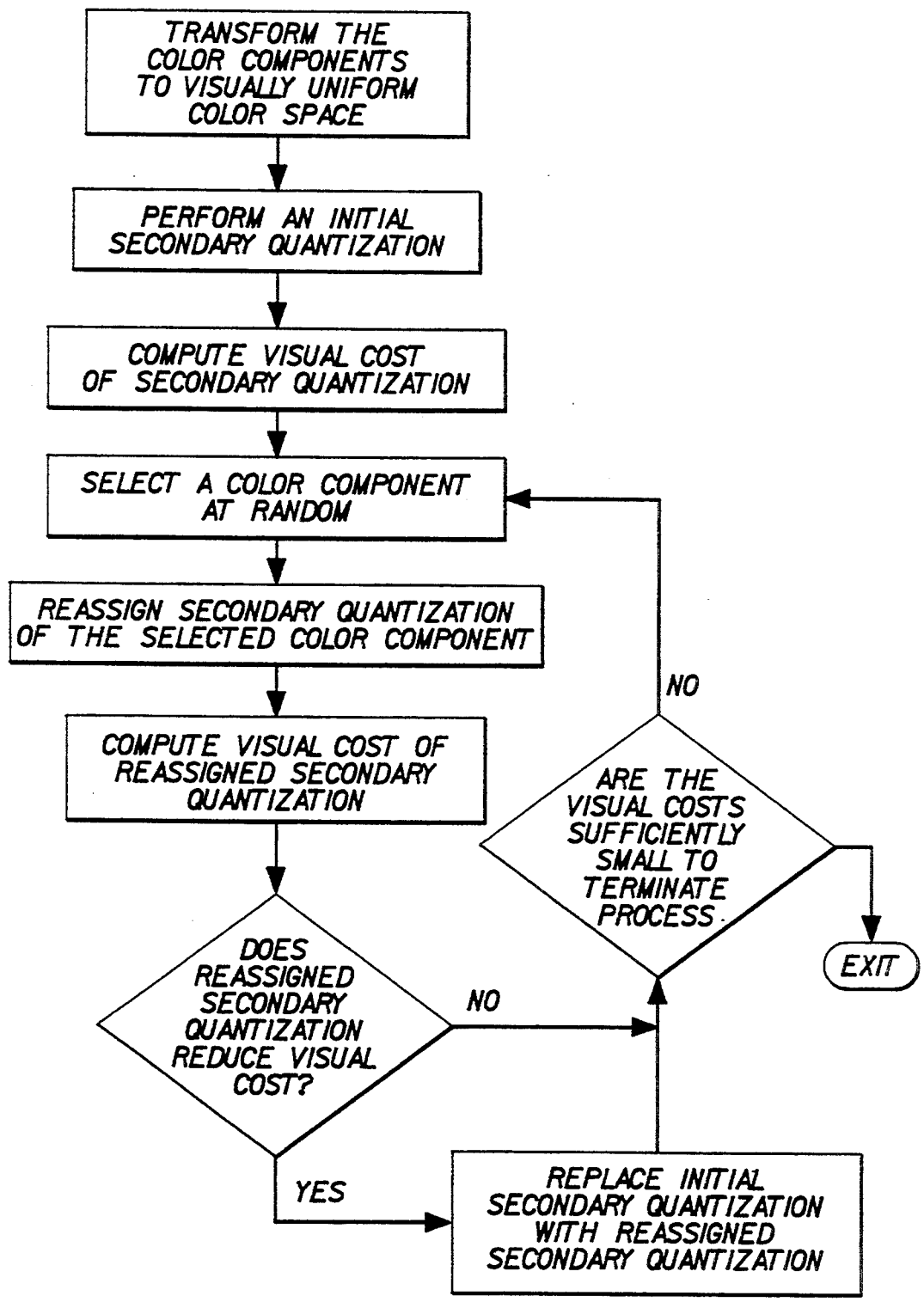
FIG. 5 is a flow chart illustrating the method for generating the requantization look-up tables according to one embodiment of the invention.

The first visual cost criteria minimization technique to be described is to minimize the total square norm visual cost defined by equation (3) and is referred to herein as the Equal-Bin-Derivative or EBD-method. Referring now to FIG. 5, the minimization process includes the following steps:

a) perform a first trial requantization on all color components of the finely quantized input decision points to form coarsely requantized output decision points that is a reasonable monotonic mapping such as uniform or a power law function, b) compute the visual cost of equation (3) for the requantization of step a), c) select a color component at random, d) perform a second requantization by reassigning the finely quantized input decision points to the coarsely requantized output decision points by the following substeps:
   i) compute the visual cost difference for each bin, i.e., one term in the sum of equation (3) for the color component chosen, that would occur if one input finely quantized decision point were removed,
   ii) compute the visual cost difference for each bin, i.e., one term in the sum of equation (3) for the color component chosen, that would occur if one input finely quantized decision point were added,
   iii) add a finely quantized decision point to the bin of substep i) that has the smallest visual cost difference,
   iv) remove a finely quantized decision point from the bin in substep ii) that has the largest visual cost difference, e) compute the visual cost of equation (3) for the reassignment of finely quantized decision points to coarsely requantized decision points of step d), f) select the requantization that has the lesser visual cost computed in step b) or e), g) if the variation in visual cost differences for each bin determined in substeps i) and ii) are sufficiently small, e.g. less than 10% of the average, then terminate the process, else replace the first quantization of step a) with the second requantization of step d) and return to step c).

The motivation for the EBD method is based upon equalizing the derivatives of the visual cost criteria with respect to bin widths, i.e., the number of finely quantized input decision points that are requantized to a single coarse requantized output decision point. Normally the bin widths are considered as the variables of the secondary quantization process. However, since there is a constraint that the sum of the bin widths must span the range of the input signal, the mapping into the space of bin widths is:

$$(z_1, \ldots, z_{255}) \to \left(z_1, \ldots, z_{255}, 4096 - \sum_{i=1}^{255} z_i\right) = (x_1, \ldots x_{256}) \quad (4)$$

Multivariable calculus (see Warner, *Foundations of Differentiable Manifolds and Lie Groups*, Scott Foresman and Company, Glenview, Ill., 1971) provides a necessary condition for a minimum of a function f that:

$$\frac{\partial f}{\partial z_k} = 0 \quad (5)$$

for all k=1, ..., 255. The differential transformation which results from the change of coordinates is:

$$0 = \frac{\partial f}{\partial z_k} = \sum_{j=1}^{256} \frac{\partial f}{\partial x_j} \frac{\partial x_j}{\partial z_k} \quad (6)$$

or in matrix form $$\begin{bmatrix} \frac{\partial f}{\partial z_i} \\ \frac{\partial f}{\partial z_2} \\ \cdot \\ \cdot \\ \frac{\partial f}{\partial z_{255}} \end{bmatrix} \begin{bmatrix} 10000 \ldots -1 \\ 01000 \ldots -1 \\ 00100 \ldots -1 \\ \ldots \ldots \ldots \\ \ldots \ldots \ldots \\ 00000 \ldots 1 -1 \end{bmatrix} \begin{bmatrix} \frac{\partial f}{\partial x_1} \\ \frac{\partial f}{\partial x_2} \\ \cdot \\ \cdot \\ \frac{\partial f}{\partial x_{256}} \end{bmatrix}$$

This implies that $$0 = \frac{\partial f}{\partial z_k} = \frac{\partial k}{\partial x_k} - \frac{\partial f}{\partial x_{256}} \quad (7)$$

for all k. Hence all partial derivatives must be equal, which is the basis for the EBD visual cost minimization method.

The EBD visual cost minimization method also assumes that adding or subtracting an input quantization level to an output bin will increase or decrease the derivatives respectively. For this to occur the derivatives of the visual cost criteria must be monotonically increasing with increasing bin width. For the square norm visual cost metric of equation (3) this condition is satisfied.

The EBD visual cost minimization method for secondary quantization of 12-bit/pixel/color digital image signals to 8-bit/pixel/color digital image signals for color primaries used in HDTV phosphors was implemented in a computer program written in C language. This computer program was executed on an AT&T Pixel Machine to produce a requantization table.

The table of input and output values is shown in Table 1 below. To implement these values in apparatus of the type shown in FIG. 1, the look-up tables would be loaded at the appropriate addresses with the 8-bit output values. For example in the LUT 18 for the red color channel, the 12-bit addresses from 0 to 7 would be loaded with the 8-bit output value of 0; from 7 to 14 it would be loaded with the value of 1, etc. Similarly, the LUTs 20 and 22 would be loaded with the corresponding values for the green and blue channels respectively.

Alternatively, only the final quantized decision points of Table 1 may be stored in look-up tables. The input signal value is processed by searching the table for the first entry that exceeds the input signal value and selecting the previous corresponding output value. This method conserves memory at the expense of increased computation.

TABLE 1

| 8-bit decision level | Red Channel | Green Channel | Blue Channel |
|---|---|---|---|
| 0 | 0 | 0 | 0 |
| 1 | 7 | 6 | 6 |
| 2 | 14 | 13 | 12 |
| 3 | 21 | 20 | 18 |
| 4 | 28 | 27 | 24 |
| 5 | 35 | 34 | 31 |
| 6 | 42 | 41 | 38 |
| 7 | 49 | 48 | 45 |
| 8 | 57 | 55 | 52 |
| 9 | 65 | 62 | 60 |
| 10 | 73 | 70 | 68 |
| 11 | 81 | 78 | 76 |
| 12 | 89 | 86 | 84 |
| 13 | 97 | 94 | 93 |
| 14 | 105 | 102 | 102 |
| 15 | 113 | 110 | 111 |
| 16 | 121 | 118 | 120 |
| 17 | 129 | 126 | 129 |
| 18 | 137 | 135 | 138 |
| 19 | 145 | 144 | 147 |
| 20 | 153 | 153 | 156 |
| 21 | 161 | 162 | 165 |
| 22 | 169 | 171 | 174 |
| 23 | 178 | 180 | 183 |
| 24 | 187 | 189 | 192 |
| 25 | 196 | 198 | 201 |
| 26 | 205 | 207 | 210 |
| 27 | 214 | 216 | 219 |
| 28 | 223 | 225 | 228 |
| 29 | 232 | 234 | 237 |
| 30 | 241 | 243 | 246 |
| 31 | 250 | 252 | 255 |
| 32 | 259 | 261 | 264 |
| 33 | 268 | 270 | 273 |
| 34 | 277 | 279 | 282 |
| 35 | 286 | 288 | 291 |
| 36 | 295 | 297 | 300 |
| 37 | 304 | 306 | 309 |
| 38 | 313 | 315 | 318 |
| 39 | 322 | 324 | 327 |
| 40 | 331 | 333 | 336 |
| 41 | 340 | 342 | 345 |
| 42 | 349 | 351 | 354 |
| 43 | 358 | 360 | 363 |
| 44 | 367 | 369 | 372 |
| 45 | 376 | 378 | 381 |
| 46 | 385 | 387 | 390 |
| 47 | 394 | 396 | 400 |
| 48 | 403 | 405 | 410 |
| 49 | 412 | 414 | 420 |
| 50 | 421 | 423 | 430 |
| 51 | 430 | 432 | 440 |
| 52 | 439 | 442 | 450 |
| 53 | 448 | 452 | 460 |
| 54 | 458 | 462 | 470 |
| 55 | 468 | 472 | 480 |
| 56 | 477 | 482 | 490 |
| 57 | 486 | 492 | 500 |
| 58 | 497 | 502 | 511 |
| 59 | 508 | 512 | 522 |
| 60 | 518 | 522 | 533 |
| 61 | 528 | 532 | 544 |
| 62 | 538 | 542 | 555 |
| 63 | 548 | 552 | 566 |
| 64 | 559 | 563 | 577 |
| 65 | 570 | 574 | 588 |
| 66 | 581 | 585 | 600 |
| 67 | 592 | 596 | 612 |
| 68 | 602 | 607 | 624 |
| 69 | 613 | 618 | 636 |
| 70 | 624 | 629 | 648 |
| 71 | 635 | 640 | 660 |
| 72 | 646 | 651 | 672 |

TABLE 1-continued

| 8-bit decision level | Red Channel | Green Channel | Blue Channel |
| --- | --- | --- | --- |
| 73 | 657 | 662 | 684 |
| 74 | 669 | 673 | 696 |
| 75 | 680 | 684 | 708 |
| 76 | 692 | 695 | 720 |
| 77 | 703 | 706 | 732 |
| 78 | 714 | 718 | 745 |
| 79 | 726 | 730 | 758 |
| 80 | 737 | 742 | 771 |
| 81 | 749 | 754 | 784 |
| 82 | 761 | 766 | 797 |
| 83 | 772 | 778 | 810 |
| 84 | 783 | 790 | 824 |
| 85 | 794 | 802 | 837 |
| 86 | 806 | 814 | 850 |
| 87 | 818 | 826 | 864 |
| 88 | 830 | 838 | 878 |
| 89 | 842 | 851 | 892 |
| 90 | 854 | 864 | 906 |
| 91 | 865 | 877 | 920 |
| 92 | 879 | 890 | 934 |
| 93 | 892 | 903 | 949 |
| 94 | 905 | 916 | 964 |
| 95 | 919 | 929 | 979 |
| 96 | 933 | 942 | 994 |
| 97 | 946 | 955 | 1009 |
| 98 | 959 | 968 | 1024 |
| 99 | 973 | 981 | 1039 |
| 100 | 987 | 995 | 1054 |
| 101 | 1001 | 1009 | 1069 |
| 102 | 1015 | 1023 | 1085 |
| 103 | 1028 | 1037 | 1101 |
| 104 | 1042 | 1051 | 1117 |
| 105 | 1055 | 1065 | 1133 |
| 106 | 1068 | 1079 | 1149 |
| 107 | 1082 | 1093 | 1165 |
| 108 | 1097 | 1107 | 1181 |
| 109 | 1111 | 1121 | 1197 |
| 110 | 1126 | 1135 | 1213 |
| 111 | 1140 | 1150 | 1229 |
| 112 | 1155 | 1165 | 1245 |
| 113 | 1169 | 1180 | 1261 |
| 114 | 1184 | 1195 | 1277 |
| 115 | 1199 | 1210 | 1293 |
| 116 | 1214 | 1225 | 1309 |
| 117 | 1229 | 1240 | 1325 |
| 118 | 1245 | 1256 | 1341 |
| 119 | 1261 | 1271 | 1357 |
| 120 | 1275 | 1287 | 1373 |
| 121 | 1291 | 1303 | 1389 |
| 122 | 1306 | 1319 | 1405 |
| 123 | 1321 | 1335 | 1421 |
| 124 | 1336 | 1351 | 1437 |
| 125 | 1352 | 1367 | 1453 |
| 126 | 1367 | 1383 | 1469 |
| 127 | 1383 | 1399 | 1485 |
| 128 | 1398 | 1415 | 1501 |
| 129 | 1414 | 1431 | 1517 |
| 130 | 1431 | 1447 | 1533 |
| 131 | 1447 | 1463 | 1549 |
| 132 | 1463 | 1479 | 1565 |
| 133 | 1479 | 1495 | 1581 |
| 134 | 1496 | 1511 | 1597 |
| 135 | 1512 | 1527 | 1613 |
| 136 | 1528 | 1543 | 1629 |
| 137 | 1544 | 1559 | 1645 |
| 138 | 1560 | 1575 | 1661 |
| 139 | 1576 | 1591 | 1677 |
| 140 | 1592 | 1608 | 1693 |
| 141 | 1608 | 1624 | 1710 |
| 142 | 1625 | 1641 | 1727 |
| 143 | 1642 | 1658 | 1743 |
| 144 | 1658 | 1675 | 1760 |
| 145 | 1676 | 1692 | 1777 |
| 146 | 1694 | 1709 | 1794 |
| 147 | 1710 | 1726 | 1811 |
| 148 | 1728 | 1743 | 1828 |
| 149 | 1745 | 1761 | 1845 |
| 150 | 1762 | 1779 | 1863 |
| 151 | 1780 | 1797 | 1881 |
| 152 | 1798 | 1814 | 1898 |
| 153 | 1816 | 1832 | 1915 |
| 154 | 1834 | 1849 | 1932 |
| 155 | 1852 | 1867 | 1949 |
| 156 | 1870 | 1885 | 1967 |
| 157 | 1889 | 1903 | 1985 |
| 158 | 1909 | 1922 | 2003 |
| 159 | 1928 | 1941 | 2021 |
| 160 | 1947 | 1959 | 2039 |
| 161 | 1965 | 1978 | 2057 |
| 162 | 1985 | 1997 | 2075 |
| 163 | 2004 | 2016 | 2093 |
| 164 | 2023 | 2035 | 2111 |
| 165 | 2041 | 2054 | 2129 |
| 166 | 2061 | 2073 | 2147 |
| 167 | 2081 | 2092 | 2166 |
| 168 | 2101 | 2111 | 2184 |
| 169 | 2121 | 2130 | 2202 |
| 170 | 2142 | 2149 | 2221 |
| 171 | 2163 | 2168 | 2240 |
| 172 | 2183 | 2188 | 2258 |
| 173 | 2203 | 2208 | 2277 |
| 174 | 2223 | 2228 | 2296 |
| 175 | 2244 | 2248 | 2315 |
| 176 | 2265 | 2268 | 2334 |
| 177 | 2285 | 2288 | 2353 |
| 178 | 2305 | 2308 | 2372 |
| 179 | 2326 | 2328 | 2391 |
| 180 | 2347 | 2349 | 2411 |
| 181 | 2368 | 2370 | 2430 |
| 182 | 2388 | 2391 | 2449 |
| 183 | 2409 | 2412 | 2469 |
| 184 | 2429 | 2433 | 2488 |
| 185 | 2451 | 2454 | 2507 |
| 186 | 2472 | 2475 | 2528 |
| 187 | 2493 | 2496 | 2548 |
| 188 | 2515 | 2517 | 2568 |
| 189 | 2537 | 2538 | 2589 |
| 190 | 2559 | 2559 | 2610 |
| 191 | 2581 | 2581 | 2630 |
| 192 | 2603 | 2603 | 2651 |
| 193 | 2624 | 2625 | 2672 |
| 194 | 2646 | 2647 | 2693 |
| 195 | 2668 | 2669 | 2714 |
| 196 | 2691 | 2691 | 2735 |
| 197 | 2714 | 2713 | 2756 |
| 198 | 2737 | 2736 | 2777 |
| 199 | 2760 | 2758 | 2798 |
| 200 | 2783 | 2781 | 2819 |
| 201 | 2806 | 2804 | 2840 |
| 202 | 2828 | 2827 | 2861 |
| 203 | 2851 | 2850 | 2882 |
| 204 | 2872 | 2873 | 2903 |
| 205 | 2895 | 2896 | 2925 |
| 206 | 2917 | 2919 | 2946 |
| 207 | 2941 | 2942 | 2967 |
| 208 | 2964 | 2965 | 2988 |
| 209 | 2987 | 2988 | 3010 |
| 210 | 3010 | 3011 | 3031 |
| 211 | 3033 | 3034 | 3052 |
| 212 | 3055 | 3057 | 3073 |
| 213 | 3078 | 3080 | 3095 |
| 214 | 3101 | 3103 | 3117 |
| 215 | 3124 | 3126 | 3139 |
| 216 | 3147 | 3149 | 3162 |
| 217 | 3170 | 3172 | 3184 |
| 218 | 3193 | 3195 | 3206 |
| 219 | 3216 | 3218 | 3229 |
| 220 | 3239 | 3241 | 3251 |
| 221 | 3262 | 3264 | 3273 |
| 222 | 3284 | 3287 | 3295 |
| 223 | 3308 | 3310 | 3318 |
| 224 | 3331 | 3333 | 3340 |
| 225 | 3355 | 3356 | 3362 |
| 226 | 3379 | 3379 | 3385 |
| 227 | 3402 | 3402 | 3409 |
| 228 | 3426 | 3425 | 3432 |
| 229 | 3449 | 3448 | 3456 |
| 230 | 3473 | 3471 | 3480 |
| 231 | 3497 | 3494 | 3503 |
| 232 | 3521 | 3517 | 3526 |

TABLE 1-continued

| 8-bit decision level | Red Channel | Green Channel | Blue Channel |
|---|---|---|---|
| 233 | 3544 | 3540 | 3549 |
| 234 | 3568 | 3563 | 3572 |
| 235 | 3594 | 3586 | 3596 |
| 236 | 3618 | 3610 | 3619 |
| 237 | 3642 | 3634 | 3642 |
| 238 | 3665 | 3658 | 3665 |
| 239 | 3689 | 3682 | 3688 |
| 240 | 3713 | 3706 | 3712 |
| 241 | 3737 | 3730 | 3736 |
| 242 | 3761 | 3754 | 3760 |
| 243 | 3785 | 3778 | 3783 |
| 244 | 3808 | 3802 | 3807 |
| 245 | 3832 | 3826 | 3831 |
| 246 | 3856 | 3850 | 3855 |
| 247 | 3880 | 3875 | 3879 |
| 248 | 3904 | 3899 | 3903 |
| 249 | 3928 | 3923 | 3927 |
| 250 | 3952 | 3947 | 3951 |
| 251 | 3976 | 3971 | 3975 |
| 252 | 4000 | 3996 | 4000 |
| 253 | 4024 | 4021 | 4024 |
| 254 | 4048 | 4046 | 4048 |
| 255 | 4072 | 4072 | 4072 |
| 256 | 4096 | 4096 | 4096 |

An alternative visual cost minimization method is to secondarily quantize the finely quantized linear input signal to equalize the visual cost in each of the coarse secondary quantization bins. This method is referred to herein as the Equal-Visual-Cost or EVC-method. This approach is reasonable in that the visual cost is diffused in an "equitable" fashion. It is also intended that the result will minimize the maximum visual cost of any bins.

The EVC visual cost minimization method proceeds by the following steps. These steps are the same as those described with reference to FIG. 5 above with the exception that the step of performing a second secondary quantization is different.

a) perform a first trial requantizaton on all color components of the finely quantized input decision points to form coarsely requantized output decision points that is a reasonable monotomic mapping such as uniform or a power law function, b) compute the visual cost of equation (3) for the requantization of step a), c) select a color component at random, d) perform a second requantization by reassigning the finely quantized input decision points to the coarsely requantized output decision points by the following substeps:

i) compute the visual cost for each bin, i.e., each term in the sum of equation (3) for the color component chosen, ii) compute the average cost for all the bins, iii) adjust the bin widths according to the following equation:

$$\text{Width}_{new} = \text{Width}_{old} \sqrt{\frac{\text{average bin} \cos t}{\text{bin} \cos t}} \quad (8)$$

iv) sum the widths of the new bins and randomly add or subtract finely quantized decision points so that the sum of the widths equals m (e.g. 4096)

e) compute the visual cost of each bin for the second requantization of finely quantized decision points to coarsely requantized decision points of step d), f) select the requantization that has the lesser visual cost computed in step b) or 3), and g) if the variation in the visual cost for each bin determined in substep i) is sufficiently small, e.g. less than 10% of the average, then terminate the process, else replace the requantization of step a) with the requantization of step d) and return to step c).

The EVC visual cost minimization method for secondary quantization of 12-bit/pixel/color digital image signals to 8-bit/pixel/color digital image signals for color primaries used in HDTV phosphors was implemented in a computer program written in C language. This computer program was executed on a AT&T Pixel machine to produce the table of input and output values shown in Table 1 below. The values are implemented in apparatus as described above with respect to the EBD method.

TABLE 2

| 8-bit decision level | Red Channel | Green Channel | Blue Channel |
|---|---|---|---|
| 0 | 0 | 0 | 0 |
| 1 | 11 | 8 | 8 |
| 2 | 22 | 17 | 16 |
| 3 | 33 | 26 | 24 |
| 4 | 45 | 35 | 33 |
| 5 | 56 | 45 | 42 |
| 6 | 68 | 54 | 51 |
| 7 | 79 | 63 | 60 |
| 8 | 91 | 73 | 69 |
| 9 | 103 | 83 | 79 |
| 10 | 115 | 92 | 88 |
| 11 | 127 | 102 | 98 |
| 12 | 139 | 112 | 108 |
| 13 | 151 | 122 | 118 |
| 14 | 163 | 132 | 128 |
| 15 | 175 | 142 | 138 |
| 16 | 187 | 153 | 149 |
| 17 | 200 | 163 | 159 |
| 18 | 212 | 173 | 170 |
| 19 | 225 | 184 | 181 |
| 20 | 237 | 194 | 191 |
| 21 | 250 | 205 | 202 |
| 22 | 262 | 216 | 213 |
| 23 | 275 | 227 | 224 |
| 24 | 288 | 238 | 235 |
| 25 | 301 | 248 | 247 |
| 26 | 313 | 259 | 258 |
| 27 | 326 | 271 | 270 |
| 28 | 339 | 282 | 281 |
| 29 | 352 | 293 | 293 |
| 30 | 365 | 304 | 304 |
| 31 | 378 | 315 | 316 |
| 32 | 391 | 327 | 328 |
| 33 | 404 | 338 | 340 |
| 34 | 418 | 350 | 352 |
| 35 | 431 | 361 | 364 |
| 36 | 444 | 373 | 376 |
| 37 | 458 | 385 | 389 |
| 38 | 471 | 397 | 401 |
| 39 | 484 | 408 | 414 |
| 40 | 498 | 420 | 426 |
| 41 | 511 | 432 | 439 |
| 42 | 525 | 444 | 451 |
| 43 | 539 | 456 | 464 |
| 44 | 552 | 468 | 477 |
| 45 | 566 | 481 | 490 |
| 46 | 580 | 493 | 503 |
| 47 | 593 | 505 | 516 |
| 48 | 607 | 518 | 529 |
| 49 | 621 | 530 | 542 |
| 50 | 635 | 542 | 555 |
| 51 | 649 | 555 | 568 |
| 52 | 663 | 568 | 581 |
| 53 | 677 | 580 | 595 |
| 54 | 691 | 593 | 608 |
| 55 | 705 | 606 | 622 |
| 56 | 719 | 618 | 635 |
| 57 | 733 | 631 | 649 |

TABLE 2-continued

| 8-bit decision level | Red Channel | Green Channel | Blue Channel |
|---|---|---|---|
| 58 | 747 | 644 | 663 |
| 59 | 762 | 657 | 676 |
| 60 | 776 | 670 | 690 |
| 61 | 790 | 683 | 704 |
| 62 | 805 | 696 | 718 |
| 63 | 819 | 710 | 732 |
| 64 | 833 | 723 | 746 |
| 65 | 848 | 736 | 760 |
| 66 | 862 | 750 | 774 |
| 67 | 877 | 763 | 788 |
| 68 | 891 | 776 | 802 |
| 69 | 906 | 790 | 816 |
| 70 | 921 | 804 | 831 |
| 71 | 935 | 817 | 845 |
| 72 | 950 | 831 | 859 |
| 73 | 965 | 844 | 874 |
| 74 | 980 | 858 | 888 |
| 75 | 994 | 872 | 903 |
| 76 | 1009 | 886 | 918 |
| 77 | 1024 | 900 | 932 |
| 78 | 1039 | 914 | 947 |
| 79 | 1054 | 928 | 962 |
| 80 | 1069 | 942 | 976 |
| 81 | 1084 | 956 | 991 |
| 82 | 1099 | 970 | 1006 |
| 83 | 1114 | 984 | 1021 |
| 84 | 1129 | 999 | 1036 |
| 85 | 1144 | 1013 | 1051 |
| 86 | 1160 | 1027 | 1066 |
| 87 | 1175 | 1042 | 1081 |
| 88 | 1190 | 1056 | 1096 |
| 89 | 1205 | 1071 | 1112 |
| 90 | 1221 | 1085 | 1127 |
| 91 | 1236 | 1100 | 1142 |
| 92 | 1251 | 1114 | 1157 |
| 93 | 1267 | 1129 | 1173 |
| 94 | 1282 | 1144 | 1188 |
| 95 | 1298 | 1159 | 1204 |
| 96 | 1313 | 1173 | 1219 |
| 97 | 1329 | 1188 | 1235 |
| 98 | 1344 | 1203 | 1250 |
| 99 | 1360 | 1218 | 1266 |
| 100 | 1376 | 1233 | 1282 |
| 101 | 1391 | 1248 | 1297 |
| 102 | 1407 | 1263 | 1313 |
| 103 | 1423 | 1279 | 1329 |
| 104 | 1438 | 1294 | 1345 |
| 105 | 1454 | 1309 | 1361 |
| 106 | 1470 | 1324 | 1377 |
| 107 | 1486 | 1340 | 1393 |
| 108 | 1502 | 1355 | 1409 |
| 109 | 1518 | 1371 | 1425 |
| 110 | 1534 | 1386 | 1441 |
| 111 | 1550 | 1402 | 1457 |
| 112 | 1566 | 1417 | 1473 |
| 113 | 1582 | 1433 | 1489 |
| 114 | 1598 | 1448 | 1505 |
| 115 | 1614 | 1464 | 1522 |
| 116 | 1630 | 1480 | 1538 |
| 117 | 1646 | 1496 | 1554 |
| 118 | 1662 | 1512 | 1571 |
| 119 | 1678 | 1528 | 1587 |
| 120 | 1695 | 1543 | 1604 |
| 121 | 1711 | 1559 | 1620 |
| 122 | 1727 | 1576 | 1637 |
| 123 | 1744 | 1592 | 1653 |
| 124 | 1760 | 1608 | 1670 |
| 125 | 1776 | 1624 | 1686 |
| 126 | 1793 | 1640 | 1703 |
| 127 | 1809 | 1656 | 1720 |
| 128 | 1826 | 1673 | 1737 |
| 129 | 1842 | 1689 | 1753 |
| 130 | 1859 | 1706 | 1770 |
| 131 | 1875 | 1722 | 1787 |
| 132 | 1892 | 1738 | 1804 |
| 133 | 1908 | 1755 | 1821 |
| 134 | 1925 | 1772 | 1838 |
| 135 | 1942 | 1788 | 1855 |
| 136 | 1958 | 1805 | 1872 |
| 137 | 1975 | 1822 | 1889 |
| 138 | 1992 | 1838 | 1906 |
| 139 | 2009 | 1855 | 1923 |
| 140 | 2025 | 1872 | 1940 |
| 141 | 2042 | 1889 | 1957 |
| 142 | 2059 | 1906 | 1974 |
| 143 | 2076 | 1923 | 1991 |
| 144 | 2093 | 1940 | 2009 |
| 145 | 2110 | 1957 | 2026 |
| 146 | 2127 | 1974 | 2043 |
| 147 | 2144 | 1991 | 2061 |
| 148 | 2161 | 2009 | 2078 |
| 149 | 2178 | 2026 | 2095 |
| 150 | 2195 | 2043 | 2113 |
| 151 | 2212 | 2061 | 2130 |
| 152 | 2229 | 2078 | 2148 |
| 153 | 2246 | 2095 | 2165 |
| 154 | 2264 | 2113 | 2183 |
| 155 | 2281 | 2130 | 2200 |
| 156 | 2298 | 2148 | 2218 |
| 157 | 2315 | 2166 | 2235 |
| 158 | 2332 | 2183 | 2253 |
| 159 | 2350 | 2201 | 2270 |
| 160 | 2367 | 2219 | 2288 |
| 161 | 2384 | 2236 | 2306 |
| 162 | 2402 | 2254 | 2324 |
| 163 | 2419 | 2272 | 2341 |
| 164 | 2436 | 2290 | 2359 |
| 165 | 2454 | 2308 | 2377 |
| 166 | 2471 | 2326 | 2395 |
| 167 | 2489 | 2344 | 2413 |
| 168 | 2506 | 2362 | 2431 |
| 169 | 2523 | 2380 | 2448 |
| 170 | 2541 | 2398 | 2466 |
| 171 | 2558 | 2416 | 2484 |
| 172 | 2576 | 2434 | 2502 |
| 173 | 2593 | 2452 | 2520 |
| 174 | 2611 | 2471 | 2538 |
| 175 | 2629 | 2489 | 2556 |
| 176 | 2646 | 2507 | 2574 |
| 177 | 2664 | 2526 | 2593 |
| 178 | 2681 | 2544 | 2611 |
| 179 | 2699 | 2563 | 2629 |
| 180 | 2717 | 2581 | 2647 |
| 181 | 2734 | 2600 | 2665 |
| 182 | 2752 | 2618 | 2683 |
| 183 | 2770 | 2637 | 2702 |
| 184 | 2788 | 2656 | 2720 |
| 185 | 2805 | 2674 | 2738 |
| 186 | 2823 | 2693 | 2757 |
| 187 | 2841 | 2712 | 2775 |
| 188 | 2859 | 2731 | 2793 |
| 189 | 2876 | 2749 | 2812 |
| 190 | 2894 | 2768 | 2830 |
| 191 | 2912 | 2787 | 2849 |
| 192 | 2930 | 2806 | 2867 |
| 193 | 2948 | 2825 | 2886 |
| 194 | 2966 | 2844 | 2904 |
| 195 | 2983 | 2863 | 2923 |
| 196 | 3001 | 2883 | 2941 |
| 197 | 3019 | 2902 | 2960 |
| 198 | 3037 | 2921 | 2979 |
| 199 | 3055 | 2940 | 2997 |
| 200 | 3073 | 2960 | 3016 |
| 201 | 3091 | 2979 | 3035 |
| 202 | 3109 | 2998 | 3053 |
| 203 | 3127 | 3018 | 3072 |
| 204 | 3145 | 3037 | 3091 |
| 205 | 3163 | 3057 | 3110 |
| 206 | 3181 | 3076 | 3128 |
| 207 | 3199 | 3096 | 3147 |
| 208 | 3217 | 3115 | 3166 |
| 209 | 3235 | 3135 | 3185 |
| 210 | 3253 | 3155 | 3204 |
| 211 | 3271 | 3175 | 3223 |
| 212 | 3289 | 3194 | 3242 |
| 213 | 3307 | 3214 | 3261 |
| 214 | 3326 | 3234 | 3280 |
| 215 | 3344 | 3254 | 3299 |
| 216 | 3362 | 3274 | 3318 |
| 217 | 3380 | 3294 | 3337 |

TABLE 2-continued

| 8-bit decision level | Red Channel | Green Channel | Blue Channel |
|---|---|---|---|
| 218 | 3398 | 3314 | 3356 |
| 219 | 3416 | 3334 | 3375 |
| 220 | 3434 | 3354 | 3394 |
| 221 | 3453 | 3374 | 3413 |
| 222 | 3471 | 3394 | 3433 |
| 223 | 3489 | 3414 | 3452 |
| 224 | 3507 | 3435 | 3471 |
| 225 | 3525 | 3455 | 3490 |
| 226 | 3544 | 3475 | 3509 |
| 227 | 3562 | 3496 | 3529 |
| 228 | 3580 | 3516 | 3548 |
| 229 | 3598 | 3536 | 3567 |
| 230 | 3617 | 3557 | 3587 |
| 231 | 3635 | 3577 | 3606 |
| 232 | 3653 | 3598 | 3625 |
| 233 | 3672 | 3618 | 3645 |
| 234 | 3690 | 3639 | 3664 |
| 235 | 3708 | 3659 | 3684 |
| 236 | 3727 | 3680 | 3703 |
| 237 | 3745 | 3700 | 3723 |
| 238 | 3763 | 3721 | 3742 |
| 239 | 3782 | 3742 | 3761 |
| 240 | 3800 | 3762 | 3781 |
| 241 | 3818 | 3783 | 3801 |
| 242 | 3837 | 3804 | 3820 |
| 243 | 3855 | 3824 | 3840 |
| 244 | 3874 | 3845 | 3859 |
| 245 | 3892 | 3866 | 3879 |
| 246 | 3910 | 3887 | 3898 |
| 247 | 3929 | 3907 | 3918 |
| 248 | 3947 | 3928 | 3938 |
| 249 | 3966 | 3949 | 3957 |
| 250 | 3984 | 3970 | 3977 |
| 251 | 4003 | 3991 | 3997 |
| 252 | 4021 | 4012 | 4017 |
| 253 | 4040 | 4033 | 4036 |
| 254 | 4058 | 4054 | 4056 |
| 255 | 4077 | 4075 | 4076 |
| 256 | 4096 | 4096 | 4096 |

Industrial Applicability and Advantages

The secondary quantization techniques of the present invention are useful in systems that generate digital color imagery which are required to have the number of bits that represent the imagery reduced. The invention has the advantage that is channel independent while accounting for distortions caused by cross channel interactions which simplifies that implementation from an $n^3$ element table to 3 n-element tables. The methods have advantages as they require simple one-dimensional look-up table implementation and minimal arithmetic processing. The present invention has the advantage of being mathematically optimal for the criteria of minimum square norm total visual distortion or minimum maximum visual distortion.

PARTS LIST 12 scanner
14 images
16 display device
18 look-up table
20 look-up table
22 look-up table

I claim:

1. A method of requantizing a scanned color digital image signal having a plurality of color components in a color imaging system, comprising the steps of:
    transforming a first color digital image signal to a visually uniform color space;
    iteratively requantizing said first color digital image signal and calculating a visual cost of each said requantized original color digital image signal until said requantized first color digital image signal meets a predetermined visual cost criteria;
    generating look up signals for a set of color component requantization look-up tables in a digital computer from said requantized first color digital image signal which meets the predetermined visual cost criteria;
    accessing said look up signals in said requantization look-up tables in a read only memory in said color imaging system to requantize said scanned color digital image signal; and
    displaying an image resulting from said accessed look-up signals.

2. The method of claim 1, wherein said step of iteratively requantizing said first color digital image signal and calculating a visual cost comprises:
    performing a first requantization of said first color digital image signal;
    calculating a visual cost resulting from said first requantization said first color digital image signal;
    adjusting the first requantization of said first color digital image signal based on visual cost criteria to obtain a second requantization of said first color digital image signal;
    calculating a visual cost resulting from said second requantization of said first color digital image signal;
    selecting either the first or second requantization of said first color digital image signal having the least visual cost as a new first requantization, and
    repeating steps d through f until said first requantization of said first color digital image signal meets the predetermined visual cost criteria.

3. The method of claim 2, wherein said steps of calculating the visual cost comprise calculating the statistical mean square norm visual cost.

4. The method of claim 3, wherein said step of adjusting the first requantization, comprises the following steps:
    i) select a color component from said first color digital image signal at random;
    ii) computing a visual cost difference for each bin of the first requantization for the selected color component that would occur if one finely quantized decision point were removed from each bin;
    iii) computing a visual cost difference for each bin of the first requantization for the selected color component that would occur if one finely quantized decision point were added to each bin;
    iv) add a finely quantized decision point to the line of substep ii) having the smallest visual cost difference; and
    v) remove a finely quantized decision point from the bin of substep iii) having the largest visual cost difference.

5. The method of claim 3, wherein said step of adjusting the first requantization, comprises the following steps:
    i) select a color component of said first color digital image signal at random;
    ii) computing a visual cost for each line of the first requantization for the selected color component;
    iii) adjusting the widths of said bins according to the following equation:

$$\text{Width}_{new} = \text{Width}_{old}\sqrt{\frac{\text{average } bin\cos t}{bin \cos t}}$$

iv) sum the widths of the new bins and randomly add or subtract finely quantized decision point so that the sum of the widths equals n.

6. The method claimed in claim 4, wherein said visual cost is defined as:

Visual Cost =

$$\sum_{i=0}^{m}\sum_{j=0}^{m}\sum_{k=0}^{m}\int_{b_k}^{b_{k+1}}\int_{g_j}^{g_{j+1}}\int_{r_i}^{r_{i+1}} (LA(r,g,b) - LA(\hat{r}_i,\hat{g}_j,\hat{b}_k))^2 dr\,dg\,db$$

where r, g, b the components of the color space and $$\begin{cases} \hat{r}_i = & i^{th} \text{ coarsely equalized decision point of the R component axis} \\ \hat{g}_j = & j^{th} \text{ coarsely equalized decision point of the G component axis} \\ \hat{b}_k = & k^{th} \text{ coarsely equalized decision point of the B component axis} \end{cases}$$

{$r_i$=the $i^{th}$ mid point on a continuous color component axis between the coarsely quantized decision points of the R component axis {$g_j$=the $j^{th}$ mid point on a continuous color component axis between the coarsely quantized decision points of the R component axis {$b_k$=the $k^{th}$ mid point on a continuous color component axis between the coarsely quantized decision points of the R component axis.

7. The method claimed in claim 5, wherein

Visual Cost =

$$\sum_{i=0}^{256}\sum_{j=0}^{256}\sum_{k=0}^{256}\int_{b_k}^{b_{k+1}}\int_{g_j}^{g_{j+1}}\int_{r_i}^{r_{i+1}} (LA(r,g,b) - LA(\hat{r}_i,\hat{g}_j,\hat{b}_k))^2 dr\,dg\,db$$

8. Apparatus for requantizing a scanned color digital image signal comprising:
an n-bit addressable memory for producing m-bit words, where n>m and said m-bit words are generated by transforming a first color digital image signal to a visually uniform color space and iteratively requantizing said first color digital image signal and calculating a visual cost of each said requantized first color digital image signal until said requantized first color digital image signal meets a predetermined visual cost criteria;
means for accessing said n-bit addressable memory in said color imaging system to requantize the scanned color digital image signal; and
means for displaying an image resulting from the requantized scanned color digital image signal.

9. The apparatus claimed in claim 8, wherein said scanned digital image signal is a color digitized image signal having a plurality of n-bit color components, and said memory includes a corresponding plurality of portions, each addressable by n-bit words for producing m-bit output values, where n>m.

10. The apparatus claimed in claim 9, wherein n or m are different for at least two of the color components.

11. The apparatus of claim 9 wherein n is 12 and m is 8.

12. A method for generating look-up table values for a set of color component
requantization look-up tables in a digital computer, comprising the steps of:
transforming a first color digital image signal to a visually uniform color space;
iteratively requantizing said first color digital image signal and calculating a visual cost of each said requantized first color digital image signal until said requantized first color digital image signal meets a predetermined visual cost criteria; and
generating the look-up table values for the set of color component requantization look-up tables in a digital computer from said requantized first color digital image signal which meets the predetermined visual cost criteria.

13. The method of claim 12, wherein said step of iteratively requantizing said first color digital image signal and calculating a visual cost comprises:
performing a first requantization of said first color digital image signal;
calculating a visual cost resulting from said first requantization said first color digital image signal;
adjusting the first requantization of said first color digital image signal based on visual cost criteria to obtain a second requantization of said first color digital image signal;
calculating a visual cost resulting from said second requantization of said first color digital image signal;
selecting either the first or second requantization of said first color digital image signal having the least visual cost as a new first requantization; and
repeating steps d through f until said first requantization of said first color digital image signal meets the predetermined visual cost criteria.

14. The method of claim 13, wherein said steps of calculating the visual cost comprise calculating the statistical mean square norm visual cost.

15. The method of claim 14, wherein said step of adjusting the first requantization, comprises the following steps:
i) select a color component from said first color digital image signal at random;
ii) computing a visual cost difference for each bin of the first requantization for the selected color component that would occur if one finely quantized decision point were removed from each bin;
iii) computing a visual cost difference for each bin of the first requantization for the selected color component that would occur if one finely quantized decision point were added to each bin;
iv) add a finely quantized decision point to the line of substep ii) having the smallest visual cost difference; and
v) remove a finely quantized decision point from the bin of substep iii) having the largest visual cost difference.

16. The method of claim 14, wherein said step of adjusting the first requantization, comprises the following steps:

i) select a color component of said first color digital image signal at random;

ii) computing a visual cost for each line of the first requantization for the selected color component;

iii) adjusting the widths of said bins according to the following equation:

$$\text{Width}_{new} = \text{Width}_{old} \sqrt{\frac{\text{average } bin \cos t}{bin \cos t}}$$

iv) sum the widths of the new bins and randomly add or subtract finely quantized decision point so that the sum of the widths equals n.

17. The method claimed in claim 15, wherein said visual cost is defined as:

$$\text{Visual Cost} = \sum_{i=0}^{m}\sum_{j=0}^{m}\sum_{k=0}^{m}\int_{b_k}^{b_{k+1}}\int_{g_j}^{g_{j+1}}\int_{r_i}^{r_{i+1}}(LA(r,g,b) - LA(\hat{r}_i,\hat{g}_j,\hat{b}_k))^2 drdgdb$$

where r, g, b the components of the color space and $$\begin{cases} \hat{r}_i = & i^{th} \text{ coarsely equalized decision point of the R component axis} \\ \hat{g}_j = & j^{th} \text{ coarsely equalized decision point of the G component axis} \\ \hat{b}_k = & k^{th} \text{ coarsely equalized decision point of the B component axis} \end{cases}$$

18. The method claimed in claim 16, wherein $$\text{Visual Cost} = \sum_{i=0}^{256}\sum_{j=0}^{256}\sum_{k=0}^{256}\int_{b_k}^{b_{k+1}}\int_{g_j}^{g_{j+1}}\int_{r_i}^{r_{i+1}}(LA(r,g,b) - LA(\hat{r}_i,\hat{g}_j,\hat{b}_k))^2 drdgdb$$

* * * * *